Aug. 16, 1949.    J. B. PARSONS    2,479,398
PISTON AND CYLINDER ASSEMBLY EMBODYING
A SOLENOID CONTROLLED VALVE
Filed Oct. 27, 1945
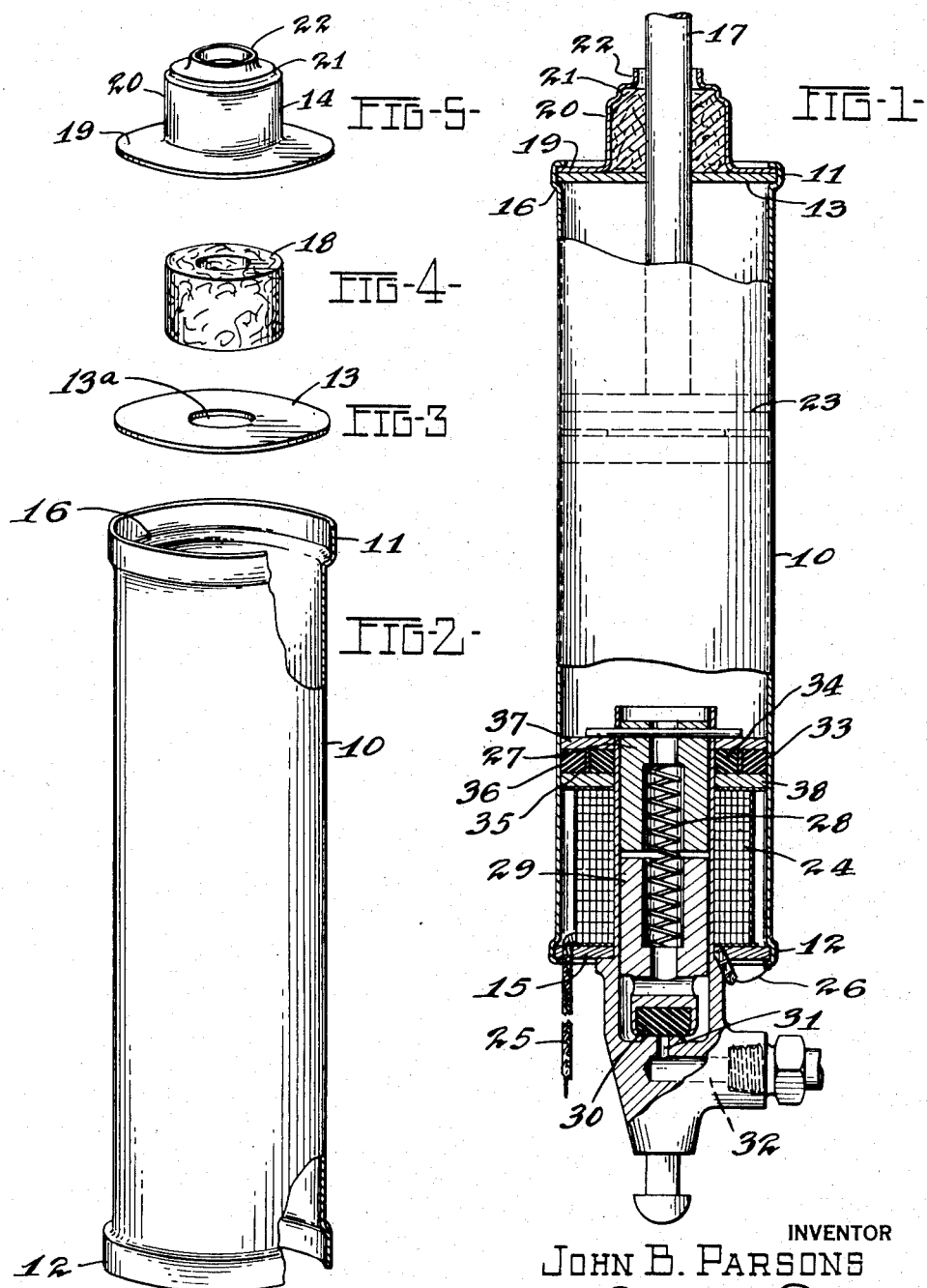
INVENTOR
JOHN B. PARSONS
BY
ATTORNEY Patented Aug. 16, 1949

2,479,398

UNITED STATES PATENT OFFICE 2,479,398

PISTON AND CYLINDER ASSEMBLY EMBODYING A SOLENOID CONTROLLED VALVE

John B. Parsons, Toledo, Ohio

Application October 27, 1945, Serial No. 624,998

5 Claims. (Cl. 121—38)

This invention relates to a fluid motor and an object of this invention is to produce a new and improved housing for containing the elements of the motor.

Another object of the invention is the production of a fluid motor housing of the above type including a cylinder and cap assembly which induces smooth and economical operation in that multiple bearing surfaces as well as lubrication is provided for the piston rod.

A further object of this invention is the production of cylinder and cap elements for a housing of the above type comprising simple sheet metal stampings compliant to efficient assembly and operation.

Other objects of this invention reside in the construction and arrangement of the elements, and for purposes of illustration but not of limitation, an embodiment of the invention is shown on the accompanying drawing in which Figure 1 is an elevation partly in section of the fluid motor showing the housing with the associated piston and electromagnetically controlled valve;

Figure 2 is a detailed view of the cylinder prior to the assembly of the cap elements;

Figure 3 is a perspective view of the disc;

Figure 4 is a perspective view of the packing sleeve; and

Figure 5 is a perspective view of the enclosing cup-shaped cap.

The illustrated embodiment of the invention comprises an elongate cylinder 10 having end portions 11 and 12 of greater diameter for receipt of closures secured therein by crimping the metal ends over the abutting annular edge portions of an apertured disc 13 and cup-shaped member 14 forming the upper closure, and an apertured closing disc 15 forming the bottom closure. The disc 13 which seats against the upper shoulder 16 is apertured at its center 13a for sliding movement of the piston rod 17 therethrough. A packing sleeve 18 bears tightly against the enclosed portion of the piston rod 17 and the adjacent portion of the disc 13 as a result of the pressure exerted upon the sleeve by the enclosing cup-shaped cap member 14, said cup-shaped cap member having a lower flange 19 abutting the outer end portion of the apertured disc 13, a vertical cylindrical section 20 and decreasing cylindrical sleeve sections 21 and 22, the latter permitting sliding movement of the piston rod 17 therethrough. The packing 18 is in the nature of a guide for the movement of the piston rod 17 and during the upstroke of the piston rod 23 air may be vented through such packing.

It is manifest that the adjacent inner surfaces of the sleeve 21, packing ring 18 and the apertured disc 13 form an elongate bearing surface which guides the reciprocal movement of the piston rod 17. Added smoothness and efficient operation of the piston rod are obtained if the packing ring is made of oil and graphite saturated felt which continuously lubricates the adjacent metallic surfaces of the piston rod.

As shown on Figure 1, the fluid motor includes the cylinder 10 in which the piston 23 and attached piston rod 17 are reciprocal. Disposed within the lower portion of the cylinder 10 and below the piston 23 is a solenoid 24 with a connecting lead 25 and ground wire 26. Disposed concentrically within the solenoid 24 is a stationary tubular sleeve member 27 which provides a seat for the upper end of a coil spring 28. The other end of the coil spring bears against a reciprocal tubular valve member 29 formed with a crimped-in rubber sealing nose 30 which is adapted to close the small port 31 leading from the fluid passage 32. In operation when the solenoid 24 is energized, the valve member 29 is moved upwardly further compressing the spring and withdrawing the rubber nose 30 from the port 31 permitting the passage of pressure fluid into the cylinder, thus raising the piston, or if the valve is similarly opened while the fluid is not under pressure, the fluid will pass from the cylinder through the passages described, and the piston will lower. Lateral ports are formed in the valve member portion above the sealing nose 27 to enable the flow of fluid when the nose is moved away from its seat. It is apparent that the solenoid and valve assembly in combination with apertured disc 15 operate to close the lower end of the said cylinder.

I have found it desirable to have a sealing ring 33 protecting the electromagnetic valve assembly from the fluids and vapors contained in adjacent fluid containing portion of the cylinder. A sealing ring composed solely of flexible rubber-like material is unsuitable for pressure resulting from the solenoid winding operations, deforms the sealing ring, thereby making it difficult to insert into the housing. I have, therefore, found it expedient to produce an improved sealing structure disposed between the stationary ring 37 and the solenoid enclosing ring 38, comprised of an inner rubber-like sealing ring 34 which bears against the upper stationary tubular sleeve member 27, an intermediate metallic spacer 35 which retains spaced relation between the metal rings 37 and 38 during winding, and an outer rubber-like sealing ring 36 which may be positioned subsequent to the winding, said last ring bearing against the cylinder wall 10 when assembled.

By way of explanation as to the purpose of the valve 30, the above described piston and cylinder assembly is particularly adapted for use in connection with hydraulically operated vehicle window regulators. In such instance, the piston rod 17 may be connected through suitable linkage to the lower edge portion of the window panel. The tube, a portion of which is shown connected to the fluid passage 32, leads to an electric motor driven pump (not shown). When such motor is energized, liquid is pumped from a reservoir (not shown) past the valve 30, the solenoid 24 having been simultaneously energized to unseat the valve 30 compressing the spring 28. Thus it will be manifest that liquid under pressure is forced into the cylinder 10 to force the piston 23 to move upwardly. On the other hand, when it is desired to lower the vehicle window, a coil spring (not shown) and which forms a part of the window regulator mechanism and which has been placed under tension during the raising of the window, pulls the window downwardly. At that time, it will be understood that the solenoid 24 alone is energized, unseating the valve 30 and the piston 23 forcing the liquid from the cylinder back to its reservoir to be available for the next window raising operation. In order to understand this operation fully, it should be mentioned that associated with the motor driven pump is a valve (not shown) which, when the pump operates, is unseated to allow liquid flow but when the pump stops, the valve is so positioned as to enable liquid from the cylinder to pass into the reservoir.

It is manifest that I have produced an improved housing for use with an electromagnetically operated fluid motor which may be constructed from simple sheet metal parts that are easily and quickly assembled. The upper closure units simultaneously guide the movements and lubricate the contained piston rod thereby improving the operation of said motor. The improved housing also has improved sealing rings which insulate the included operable elements and the interior structures from the vapors and fluids contained in the cylinder.

I have also produced a new and improved fluid motor having the solenoid and its associated fluid valve means disposed within and closing one end portion of the cylinder housing which also contains the reciprocal piston and its associated piston rod. Said fluid motor, therefore, comprises a complete motor unit operable in response to electrical switch means.

It is to be understood that numerous changes in details of construction, arrangement and operation may be effected without departing from the spirit of the invention especially as defined in the appended claims.

What I claim is:

1. A piston and cylinder assembly comprising an elongate cylinder closed at one end except for a piston rod receiving aperture, a piston in the cylinder having a rod slidable through said aperture, a solenoid controlled valve assembly in the opposite end of the cylinder and providing a closure therefor, said solenoid valve assembly including a pair of laterally spaced end members engaging the walls of the cylinder, means for crimping the cylinder wall to the outermost end member, a coil interposed between said end members, and a spring tensioned valve reciprocable within said coil, said valve being tubular to enable the passage of fluid therethrough when in open position, and liquid fluid seal means adjacent the innermost end member to prevent the flow of fluid from the cylinder to the coil.

2. A piston and cylinder assembly comprising an elongate cylinder closed at one end except for a piston rod receiving aperture, a piston in the cylinder having a rod slidable through said aperture, a solenoid controlled valve assembly in the opposite end of the cylinder and providing a closure therefor, said solenoid valve assembly including a unitary device having a pair of spaced washer-like elements, a rubber-like sealing means between said elements in sealing engagement with the walls of the cylinder, a third washer-like element, a crimped connection between the end portion of the cylinder and said third element, a coil interposed between said third element and the outermost of said first washer-like elements, a sleeve rigid with the innermost of said pair of washer-like elements, a reciprocable valve, a hollow fitting rigid with said third washer-like element and having a seat for the valve, and spring means holding said valve normally to its seat.

3. A piston-cylinder assembly as claimed in claim 2, in which the rubber-like sealing means comprises an inner rubber-like ring embracing said sleeve, a rigid ring embracing said inner ring, and an outer rubber-like ring embracing the rigid ring and in sealing engagement with the cylinder walls.

4. A piston and cylinder assembly comprising an elongate cylinder closed at one end except for a piston rod receiving aperture, a piston in the cylinder having a rod slidable through said aperture, a solenoid controlled valve assembly in the opposite end of the cylinder and providing a closure therefor, said solenoid valve assembly including longitudinally spaced washer-like members, a tubular coil intermediate said members, a spring-tensioned valve reciprocable within said coil, means to provide a fluid-tight seal with the cylinder wall at the inner side of said coil, and means for securing the end portion of said cylinder to the outermost of said washer-like members.

5. A piston and cylinder assembly comprising an elongate cylinder closed at one end except for a piston rod receiving aperture, a piston in the cylinder having a rod slidable through said aperture, a solenoid controlled valve assembly in the opposite end of the cylinder and providing a closure therefor, said solenoid valve assembly including longitudinally spaced washer-like members, a tubular coil intermediate said members, a spring-tensioned valve reciprocable within said coil, a fitting secured to the outermost of said washer-like members and having a passage communicating with said valve, said valve normally seating to close said passage, means to provide a fluid-tight seal with the cylinder wall at the inner side of said coil, and means for securing the end portion of said cylinder to the outermost of said washer-like members.

JOHN B. PARSONS.

REFERENCES CITED

The following references are of record in the file of this patent:

UNITED STATES PATENTS

| Number | Name | Date |
| --- | --- | --- |
| 1,857,053 | Kratz | May 3, 1932 |
| 1,932,649 | Trachsel | Oct. 31, 1933 |
| 2,115,845 | Forman | May 3, 1938 |
| 2,145,384 | Allin | Jan. 31, 1939 |
| 2,301,576 | Parsons et al. | Nov. 10, 1942 |
| 2,340,817 | Hurst | Feb. 1, 1944 |
| 2,343,265 | Price | Mar. 7, 1944 |
| 2,403,020 | Parsons | July 2, 1946 |